(12) United States Patent
Nuernberger et al.

(10) Patent No.: US 10,351,007 B2
(45) Date of Patent: Jul. 16, 2019

(54) CHARGING DEVICE AND SYSTEM FOR CHARGING A MOTOR VEHICLE

(71) Applicant: Bayerische Motoren Werke Aktiengesellschaft, Munich (DE)

(72) Inventors: Simon Nuernberger, Munich (DE); Philipp Oberhumer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 213 days.

(21) Appl. No.: 15/436,069

(22) Filed: Feb. 17, 2017

(65) Prior Publication Data
US 2017/0158073 A1 Jun. 8, 2017

Related U.S. Application Data

(63) Continuation of application No. PCT/EP2015/068653, filed on Aug. 13, 2015.

(30) Foreign Application Priority Data

Aug. 19, 2014 (DE) .................. 10 2014 216 371

(51) Int. Cl.
*B60L 11/18* (2006.01)
*H01M 12/08* (2006.01)
(Continued)

(52) U.S. Cl.
CPC ............ *B60L 11/1824* (2013.01); *B60L 50/64* (2019.02); *B60L 53/00* (2019.02); *B60L 53/14* (2019.02);
(Continued)

(58) Field of Classification Search
CPC .................................................. B60L 11/1824
(Continued)

(56) References Cited

U.S. PATENT DOCUMENTS

| 5,721,064 A | 2/1998 | Pedicini et al. |
| 2003/0162448 A1 | 8/2003 | Routtenberg et al. |

(Continued)

FOREIGN PATENT DOCUMENTS

| DE | 697 03 489 T2 | 5/2001 |
| DE | 697 09 402 T2 | 9/2002 |

(Continued)

OTHER PUBLICATIONS

International Search Report (PCT/ISA/210) issued in PCT Application No. PCT/EP2015/068653 dated Oct. 27, 2015 with English translation (seven pages).

(Continued)

*Primary Examiner* — James M Erwin
(74) *Attorney, Agent, or Firm* — Crowell & Moring LLP

(57) ABSTRACT

A charging device for charging a motor vehicle includes an energy supply unit which is arranged externally in relation to the motor vehicle, and which is designed to provide electrical current for a solid-state gas battery of the motor vehicle. In addition, the charging device includes a gas supply unit which is arranged externally in relation to the motor vehicle and which is designed to provide gas for the solid-state gas battery of the motor vehicle. Furthermore, the charging device has at least one supply connection by which the energy supply unit can be coupled to the motor vehicle for the purposes of a charging process for supplying electrical current for the solid-state gas battery, and by which the gas supply unit can be coupled to the motor vehicle for the purposes of the charging process for supplying gas for the solid-state gas battery.

14 Claims, 2 Drawing Sheets

(51) Int. Cl.
*H01M 8/04111* (2016.01)
*H01M 8/0668* (2016.01)
*H01M 8/0662* (2016.01)
*H01M 10/44* (2006.01)
*B60L 53/14* (2019.01)
*B60L 53/00* (2019.01)
*B60L 53/30* (2019.01)
*B60L 50/64* (2019.01)
*B60L 58/32* (2019.01)
*H01M 10/42* (2006.01)

(52) U.S. Cl.
CPC ............. *B60L 53/30* (2019.02); *B60L 53/305* (2019.02); *B60L 58/32* (2019.02); *H01M 8/04111* (2013.01); *H01M 8/0668* (2013.01); *H01M 8/0687* (2013.01); *H01M 10/44* (2013.01); *H01M 12/08* (2013.01); *H01M 10/42* (2013.01); *H01M 2010/4278* (2013.01); *H01M 2220/20* (2013.01); *Y02E 60/128* (2013.01); *Y02T 10/7005* (2013.01); *Y02T 10/705* (2013.01); *Y02T 10/7072* (2013.01); *Y02T 90/14* (2013.01)

(58) Field of Classification Search
USPC .................................................. 429/7; 701/22
See application file for complete search history.

(56) References Cited

U.S. PATENT DOCUMENTS

| | | | |
|---|---|---|---|
| 2010/0241470 A1* | 9/2010 | Smith | ................. G06Q 10/087 429/61 |
| 2011/0033733 A1 | 2/2011 | Ouchi | |
| 2011/0143227 A1 | 6/2011 | Pulskamp et al. | |
| 2012/0021303 A1 | 1/2012 | Amendola et al. | |
| 2012/0041628 A1 | 2/2012 | Hermann et al. | |
| 2013/0187591 A1 | 7/2013 | Stewart et al. | |
| 2013/0273444 A1 | 10/2013 | Hermann | |

FOREIGN PATENT DOCUMENTS

| | | |
|---|---|---|
| EP | 0 779 668 A1 | 6/1997 |
| JP | 2007-192410 A | 8/2007 |
| JP | 2013-2581 A | 1/2013 |
| WO | WO 98/18172 A1 | 4/1998 |
| WO | WO 2014/060579 A1 | 4/2014 |
| WO | WO 2014/084243 A1 | 1/2017 |

OTHER PUBLICATIONS

German-language Written Opinion (PCT/ISA/237) issued in PCT Application No. PCT/EP2015/068653 dated Oct. 27, 2015 (nine pages).

German Search Report issued in counterpart German Application No. 10 2014 216 371.4 dated Jul. 14, 2015 with partial English translation (12 pages).

* cited by examiner

CHARGING DEVICE AND SYSTEM FOR CHARGING A MOTOR VEHICLE

CROSS REFERENCE TO RELATED APPLICATIONS

This application is a continuation of PCT International Application No. PCT/EP2015/068653, filed Aug. 13, 2015, which claims priority under 35 U.S.C. § 119 from German Patent Application No. 10 2014 216 371.4, filed Aug. 19, 2014, the entire disclosures of which are herein expressly incorporated by reference.

This application contains subject matter related to U.S. application Ser. No. 15/436,024, entitled "Operating Device and System for Operating a Motor Vehicle" filed on Feb. 17,2017.

BACKGROUND AND SUMMARY OF THE INVENTION

The present invention relates to a charging device and a system for charging a motor vehicle, which charging device and system are suitable for supplying electrical current and gas to the motor vehicle for the operation of a solid-gas battery.

Motor vehicles with electric motors are an alternative to motor vehicles with conventional drive by way of internal combustion engines. An advantage of electric motors is the local absence of emissions with regard to pollutant emissions. The drive energy of an electric motor is generally provided by way of rechargeable accumulators. In this context, as accumulators, use is often made of lithium-ion batteries which impart the required drive energy for the operation of the motor vehicle.

Alternatives to lithium-ion batteries are, for example, lithium-air batteries or, more generally, solid-gas batteries, which have for example a considerably greater energy density and power capacity than present lithium-ion batteries, which can have an advantageous effect inter alia on a possible range of the motor vehicle. As a result, for motor vehicles with solid-gas batteries, special charging devices are also required, which provide the motor vehicle with the required fuel for the operation of the solid-gas battery.

The document US 2012/0041628 A1 describes a system and a method suitable for electrically charging a metal-air battery arranged in a motor vehicle. For this purpose, there are also arranged in the motor vehicle a compressor and a tank which, together with an external power source, permit a charging cycle of the metal-air battery.

An object on which the invention is based is that of providing a charging device and a system which are suitable for permitting a supply of electrical current and gas for a solid-gas battery of a motor vehicle in a simple manner.

The object is achieved by way of a charging device and system in accordance with embodiments of the invention.

According to a first aspect of the invention, a charging device for charging a motor vehicle includes an energy supply unit which is arranged externally with respect to the motor vehicle and which is designed to provide electrical current for a solid-gas battery of the motor vehicle. The charging device furthermore includes a gas supply unit which is arranged externally with respect to the motor vehicle and which is designed to provide gas for the solid-gas battery of the motor vehicle. Furthermore, the charging device has at least one supply connection by way of which the energy supply unit can be coupled to the motor vehicle, during the course of a charging process, for the supply of electrical current for the solid-gas battery and by way of which the gas supply unit can be coupled to the motor vehicle, during the course of a charging process, for the supply of gas for the solid-gas battery.

By way of a charging device of said type, charging with electrical current and gas for a motor vehicle which has a solid-gas battery is made possible in a simple manner.

Solid-gas batteries have an anode, which is composed of a solid, and a cathode, which is spaced apart from said anode and which is composed for example of mesoporous carbon and which may figuratively be viewed as a type of sponge. Between the solid anode and the cathode, there is typically situated an electrolyte which, depending on the embodiment of the solid-gas battery, may for example be in solid or liquid form. By way of a supply of gas, a current flow is induced in the solid-gas battery, which current flow can be utilized for the purposes of supplying energy. It is basically the case, during discharging of the solid-gas battery, that positive ions and electrodes are detached from the solid anode and pass over into the electrolyte. During the further process, the positive ions become coupled, at the cathode, to atoms or molecules of the supplied gas and are electrochemically bonded there. The electrons that are emitted during said process are available for charge transport, and thereby permit a current flow and an electrical supply to components coupled to the solid-gas battery. If, for example, an external voltage potential is applied to the solid-gas battery, which voltage potential exceeds the potential during the discharging of the solid-gas battery, the described process is reversed, and the solid-gas battery is charged. In this case, the electrochemical bonds between the ions of the solid anode and the atoms or molecules of the supplied gas are severed again. As a result, the ions travel through the electrolyte to the solid anode and set down on the latter by way of recombination with electrons. Furthermore, the electrochemically bonded gas is also emitted again, which gas is for example released into an exterior region or can be recirculated for a further cycle of the solid-gas battery.

With regard to the claimed invention, by way of the described charging device, it is the case inter alia that an electrical current is provided by the at least one supply connection, which electrical current represents an external voltage potential and thus permits charging of the solid-gas battery. The energy supply unit is for example a separate component of the charging device, which includes for example a generator, and/or said energy supply unit is coupled to an energy supply network from which it draws the electrical current required for the charging of the motor vehicle. It is preferable for direct current or direct-current voltage to be provided by the energy supply unit, because this permits a faster charging process than charging with alternating current or alternating-current voltage. Charging with alternating current or alternating-current voltage is however likewise possible, such that, in this context, it is for example the case that the charging device or the motor vehicle includes components for current or voltage conversion, such as for example a rectifier. In this way, it is ensured that the solid-gas battery is supplied with direct current or direct-current voltage which is required for the charging of the solid-gas battery.

The gas that is emitted during the course of the charging process may for example be released from the solid-gas battery or from the motor vehicle, or said gas is reused for a further driving cycle of the solid-gas battery. In this case, it is for example the case that a high-pressure tank is arranged in the motor vehicle, which high-pressure tank can be coupled to the at least one supply connection of the charging device.

If the emitted gas is for example released from the motor vehicle, it is also the case that gas for the solid-gas battery is provided by way of the described charging device, which gas can be supplied to the motor vehicle during the course of the charging process. A reason for this may be that a user of the motor vehicle seeks to exchange the previously used gas for a different gas type in order to thereby for example increase the efficiency of the solid-gas battery and the possible range of the motor vehicle. In this context, the charging device and the motor vehicle are correspondingly designed to perform such a gas exchange during the course of the charging process. Furthermore, in such a case, the solid-gas battery is designed to be operated using different gas types. For example, the gas supply unit of the charging device then includes multiple gas tanks with different gas types for solid-gas batteries, and provides said different gas types for the charging process of the motor vehicle. Alternatively or in addition, the gas supply unit is also coupled to a gas supply network, and draws one or more gas types therefrom for supply to the motor vehicle.

The charging with electrical current and gas for the solid-gas battery may for example take place simultaneously or in temporal succession during the course of the charging process. The at least one supply connection is in this case designed correspondingly for this purpose, and is coupled to the energy supply unit and to the gas supply unit. For example, the at least one supply connection includes an insulated electrical line for the supply of the electrical current during the course of the charging process, which insulated electrical line is surrounded by a gas line for the supply of the gas. During the course of the charging process, it is for example also possible for gas to be received from the motor vehicle via said gas line, which gas is for example emitted during the charging of the solid-gas battery. Alternatively, the charging device also includes, for this purpose, a further gas line which is for example also couplable to the motor vehicle by way of the at least one supply connection. The at least one supply connection is, in this context, realized for example as a type of combination connection, which is thus designed so as to permit at least the described functions.

Alternatively or in addition, the described charging device has further supply connections such that, during the course of the charging process, it is for example the case that a first supply connection is available for the supply of electrical current and a second supply connection is available for the supply of gas for the solid-gas battery. Here, the second supply connection may also be designed for receiving gas from the motor vehicle, or it is for example the case that a third supply connection is provided which performs said function. The one or more supply connections are, in this context, designed so as to have for example common connector shapes in accordance with their function. They may however also be designed differently in terms of their shape such that, during the course of the charging process, it is at least the case that charging with electrical current and/or gas for the solid-gas battery is possible at all times.

In a refinement of the first aspect, the gas supply unit includes a compressor which is designed to compress gas for the solid-gas battery and supply said gas to the motor vehicle, said gas being provided during the course of the charging process.

In this way, it is possible for the gas required for the operation of the solid-gas battery to be provided to the motor vehicle in compressed form, in order to thereby for example fill a high-pressure tank of the motor vehicle. By virtue of the gas being supplied to the motor vehicle in compressed form during the course of the charging process, it is possible for a greater gas volume to be stored, for example in the high-pressure tank of the motor vehicle, which can have an advantageous effect on the power capacity of the solid-gas battery and the possible range of the motor vehicle. Correspondingly, it is also possible for the dimensioning of the high-pressure tank in the motor vehicle to be adapted, which may be performed inter alia in a manner dependent on the gas pressure, the desired possible range of the motor vehicle and the power capacity of the solid-gas battery.

The compressor is, as a component of the gas supply unit, arranged externally with respect to the motor vehicle and, in accordance with the claimed invention, is for example integrated into an external charging station. This permits for example storage of compressed gas in the high-pressure tank of motor vehicles which themselves do not have an on-board compressor. In this way, it is possible to realize motor vehicles with solid-gas batteries in which weight, volume and costs that would be involved in the case of a compressor being installed in a motor vehicle can be eliminated. The weight reduction of the motor vehicle made possible by way of the described charging device has an advantageous effect on the energy density and power capacity of the solid-gas battery, and, by way of the associated volume reduction, permits an adaptation of other components of the motor vehicle, such as for example of the high-pressure tank. On this basis, said high-pressure tank can be made larger in terms of its dimensions than would be possible in the case of a motor vehicle with compressor. Consequently, the arrangement of the compressor in the charging device externally with respect to the motor vehicle contributes to more efficient operation of the solid-gas battery.

In a further refinement of the first aspect, the charging device includes a gas-receiving unit which is arranged externally with respect to the motor vehicle and which is designed to receive gas from the motor vehicle during the course of the charging process.

In this way, it is possible by way of the gas-receiving unit for gas to be received from the motor vehicle, and stored for example in a gas tank, during the course of the charging process. For example, an exchange of the gas for the solid-gas battery is made possible in this way. If the solid-gas battery is for example designed to be operated with synthetic air or pure oxygen, the gas types can be released and exchanged as required during the course of the charging process. For example, here, the gas supply unit of the charging device includes the provision of at least the two stated gas types, and thus permits the charging with the desired gas during the course of the charging process. It is thus possible, for example, for synthetic air which has previously been introduced into the tank to be exchanged for pure oxygen, which possibly permits greater efficiency of the solid-gas battery, and thus a greater range of the motor vehicle, in relation to the synthetic air.

Furthermore, by way of the gas-receiving unit, it is also possible during the course of the charging process for the emitted gas, which as a result of the operation during the discharging of the solid-gas battery was chemically bonded to the positive ions of the solid on the cathode, to be received and supplied again to the high-pressure tank of the motor vehicle.

In a further refinement of the first aspect, the gas-receiving unit is coupled to the gas supply unit and is designed to at least partially supply to the gas supply unit the gas that is received from the motor vehicle during the course of the charging process.

In this context, it is for example the case that the gas that is emitted during the course of the charging process is received from the motor vehicle by way of the at least one supply connection and, during the further process, is supplied to the gas supply unit for example via one or more feed lines. The received gas can thereupon be compressed again by way of the compressor and conducted, for a further driving cycle, to the high-pressure tank of the motor vehicle for the solid-gas battery. The received gas is possibly supplied only partially to the gas supply unit and to the motor vehicle, for example because the quality of the received gas does not altogether correspond to the desired specifications. As a result, it is for example the case that a part of the received gas is mixed with gas which is provided via the gas supply unit by a gas supply network or by a gas tank, such that the gas supplied to the motor vehicle for the solid-gas battery meets the predefined requirements. The monitoring of the quality of the received and supplied gas is performed for example by way of sensors in the one or more feed lines, which sensors analyze for example a concentration of various substances which are detrimental to the operation of the solid-gas battery.

Furthermore, the gas-receiving unit may for example also be in the form of a simple feed line which couples the at least one supply connection of the charging device to the compressor. Particularly straightforward recycling of the emitted gas of the solid-gas battery of the motor vehicle is realized in this way during the course of the charging process.

In a further refinement of the first aspect, the gas supply unit includes a gas treatment unit.

The gas treatment unit permits for example filtering of the gas before said gas is supplied to the motor vehicle for the solid-gas battery. In this way, it is possible for constituents that can adversely affect operation of the solid-gas battery to be filtered out of the gas. The gas treated in this way is then supplied for example to the high-pressure tank of the motor vehicle.

For example, the gas can, by way of the gas treatment unit, be substantially purified for removal of water and carbon dioxides, which adversely influence the operation of the solid-gas battery even in the range from, for example, 100 to 400 ppm, and which can permanently damage the solid-gas battery. Other contaminants, such as for example particles and hydrocarbons, may also be separated out in this way, such that, for example, as a result of treatment of the gas, synthetic air is generated which is composed substantially only of nitrogen and oxygen. The synthetic air may thereupon be supplied to the motor vehicle during the course of the charging process, and is stored for example in the gas-receiving unit of the charging device.

The gas treatment unit is in this case for example coupled to one or more gas tanks of the gas supply unit and to the gas supply network and thus permits purification of the gas before said gas is supplied to the motor vehicle during the course of the charging process.

This is conducive to achieving a longer service life of the solid-gas battery, and it is possibly also the case that a time for maintenance of the solid-gas battery of the motor vehicle is delayed.

In a further refinement of the first aspect, the charging device includes at least one gas tank which is arranged externally with respect to the motor vehicle and which is coupled to the gas supply unit.

As already described, the gas supply unit may be coupled to at least one gas supply network and/or to at least one gas tank in order, during the course of the charging process, to permit charging with gas for the solid-gas battery of the motor vehicle. The at least one gas tank includes for example synthetic air or pure oxygen.

In a further refinement of the first aspect, the charging device includes an air-conditioning system which is designed to cool or heat the gas for the solid-gas battery of the motor vehicle before and/or during the charging process.

By way of the air-conditioning system of the described charging device, it is possible for the gas to be temperature-controlled to an optimum temperature which permits for example fast and/or battery-preserving charging with the gas in conjunction with the charging process of the motor vehicle. For example, by way of the air-conditioning system, a certain temperature range of the gas provided by the gas supply unit is maintained, which temperature range realizes optimum operation of the solid-gas battery of the motor vehicle within a short time. For example, the at least one gas tank is a cryogenic store which permits for example charging with liquid oxygen for the motor vehicle. During operation of the motor vehicle, it is for example the case that the liquid oxygen is supplied from the high-pressure tank to the solid-gas battery and evaporates owing to ambient temperatures, and is thus present in the gaseous state of aggregation again.

In a further refinement of the first aspect, the charging device includes a communication interface which is designed to, during the course of the charging process, exchange signals for the control of the charging process between the charging device and the motor vehicle.

By way of the communication interface, it is possible for the charging device to communicate with the motor vehicle and thus control the charging process of the motor vehicle. In this context, the motor vehicle is, for example, equipped with a corresponding communication interface which permits such communication. For example, in this way, a vehicle or battery management system of the motor vehicle is controlled by the charging device, which vehicle or battery management system monitors inter alia the charging process. Here, the communication includes a transmission of various items of information, such as for example a status of the charging process, a system pressure, an oxygen content of the supplied gas, a fill level of the high-pressure tank, a pressure in the solid-gas battery, a gas temperature, a battery temperature. The charging device is furthermore designed to determine the items of information and measurement values required for the communication, and can for example monitor the charging process by way of various sensors. This, for example, also encompasses control of a thermal management system.

Owing to the communication between the charging device and the motor vehicle, an optimum and reliable charging process for the solid-gas battery is made possible.

According to a second aspect, a system for charging a motor vehicle includes a charging device according to one of the above-described refinements of the first aspect and the motor vehicle, which has a solid-gas battery and at least one charging connection for the supply of electrical current and/or gas for the solid-gas battery during the course of a charging process by way of the charging device.

The charging device represents, for example, a charging station in the public infrastructure for motor vehicles with solid-gas batteries, and may be understood substantially analogously to a refueling station for example for motor vehicles with internal combustion engines. By contrast to known refueling stations, a charging station of said type permits charging with electrical current and/or gas for solid-gas batteries for motor vehicles. In this way, it is possible to realize operation of motor vehicles with electric motors which exhibit considerably greater potential, with regard to the possible energy density and power capacity, then previous motor vehicles with, for example, lithium-ion accumulators.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
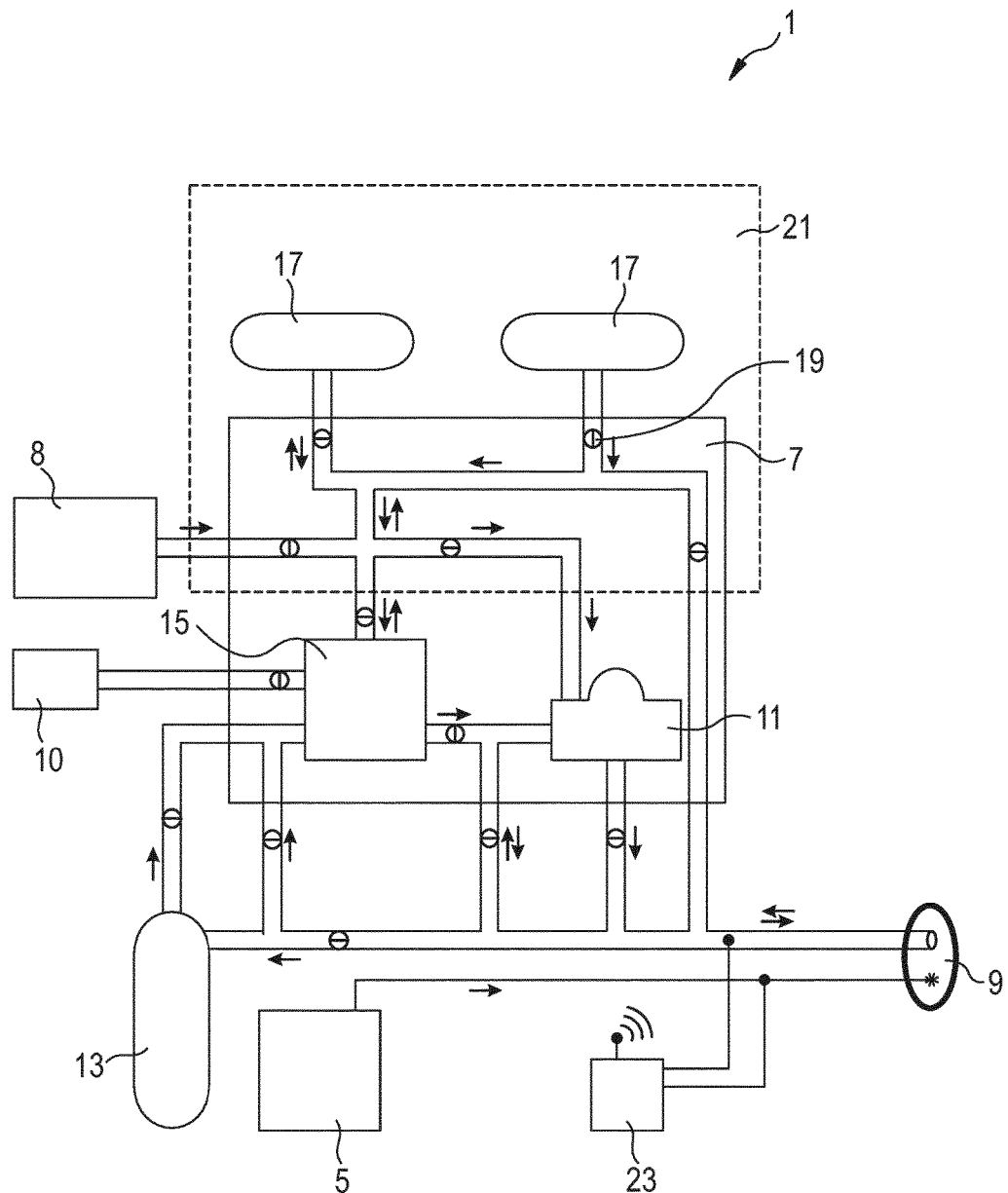
FIG. 1 is a schematic diagram of an exemplary embodiment of a charging device for charging a motor vehicle.

FIG. 1 illustrates an exemplary embodiment of a charging device 1 which permits charging with electrical current and/or gas for a motor vehicle 3 (see FIG. 2) which has a solid-gas battery 33. The charging device 1 includes an energy supply unit 5 and a gas supply unit 7 which are arranged externally with respect to the motor vehicle 3 and which provide electrical current and gas for a charging process of the motor vehicle 3.

The charging process of the motor vehicle 3 is realized by way of at least one supply connection 9 which is coupled to the energy supply unit 5 and to the gas supply unit 7. In this exemplary embodiment, the gas supply unit 7 is coupled by way of a pipeline system, and the energy supply unit is coupled by way of an electrical line, to the supply connection 9. A throughflow and a direction of the propagating gas in the pipeline system may be controlled for example by way of valves 19 which, in FIG. 1, are arranged by way of example at various positions in the pipeline system. Here, median lines in the symbols of the valves 19 indicate whether the valves 19 are oriented in a blocking direction or in a pass-through direction. A blocking direction of a valve 19 is illustrated by virtue of the median line in the symbols of the valves 19 being drawn transversely with respect to the pipe walls of the respective pipeline of the pipeline system. Furthermore, independently of the orientation of the valves 19, arrows at the pipelines of the pipeline system indicate the direction in which a gas flow will preferentially take place. Double arrows indicate that a gas flow is possible in both illustrated directions.

The energy supply unit 5 is for example a separate component of the charging device 1, which energy supply unit includes for example a generator and/or a static battery and/or is coupled to an energy supply network from which it draws the electrical current required for the charging of the motor vehicle 3. Direct current or direct-current voltage is preferably provided by the energy supply unit 5, because this permits a faster charging process than charging with alternating current or alternating-current voltage. Charging with alternating current or alternating-current voltage is however likewise possible, such that, in this context, the charging device 1 or the motor vehicle 3 comprise for example components for current or voltage conversion, such as for example a rectifier. In this way, it is ensured that the solid-gas battery 33 is supplied with direct current or direct-current voltage that is required for the charging of the solid-gas battery 33.

In this exemplary embodiment, the gas supply unit 7 of the charging device 1 is coupled to two gas tanks 17 in which different gas types for the solid-gas battery 33 are stored, which gas types are provided by said gas supply unit for the charging process of the motor vehicle. For example, the solid-gas battery 33 is designed to be operated with synthetic air or pure oxygen, such that the gas supply unit 7 permits charging with different gas types during the course of the charging process. Alternatively or in addition, the gas supply unit 7 is also coupled to a gas supply network and, from the latter, draws one or more gas types for supply to the motor vehicle 3 during the course of the charging process. In FIG. 1, the gas supply unit 7 is, by way of example, coupled to an external gas reservoir 8 which ensures a gas supply additionally to the two illustrated gas tanks 17. Alternatively or in addition to the gas reservoir 8, it is also possible for gas to be drawn from the ambient air for a charging process of the motor vehicle 3, as is illustrated representatively in FIG. 1 by way of a connection 10 for ambient air.

Solid-gas batteries 33 are an alternative to, for example, known lithium-ion batteries, and offer a considerably greater energy density and power capacity in relation thereto, which can have an advantageous effect inter alia on a possible range of the motor vehicle 3. A subset of solid-gas batteries 33 are metal-air batteries, and a specific example in the context is lithium-air batteries.

Solid-gas batteries 33 have an anode, which is composed of a solid, and a cathode, which is spaced apart from said anode. By way of a supply of gas, a current flow is induced in the solid-gas battery 33, which current flow can be utilized for the purposes of supplying energy in the motor vehicle 3. In this way, it is possible inter alia for an electric motor of the motor vehicle 3 to be driven, which electric motor converts the electrical energy of the solid-gas battery 33 into mechanical power and thereby permits propulsion of the motor vehicle 3. This consequently leads to a discharge of the solid-gas battery 33, in the case of which atoms or molecules of the gas electrochemically bond with positive ions of the solid on the cathode.

To recharge the solid-gas battery 33, during the course of the charging process, the motor vehicle 3 is coupled, for example by way of at least one charging connection 31, to the supply connection 9 of the charging device 1. The energy supply unit 5 thereupon supplies electrical current to the solid-gas battery 33, which electrical current substantially represents an external voltage potential which is applied to the solid-gas battery 33. The above-described discharging process is consequently reversed, and the solid-gas battery 33 is charged. During the charging, the electrochemical bonds between the ions of the solid anode and the atoms or molecules of the supplied gas are severed again. As a result, the electrochemically bonded gas is emitted again and can be released into an exterior region of the motor vehicle 3 or recirculated into the motor vehicle 3 again for a further cycle of the solid-gas battery 33.

In this context, the supply connection 9 is additionally designed to receive gas from the motor vehicle 3 during the course of the charging process. For this purpose, there is for example arranged on the motor vehicle 3 a gas release connection 37 which permits a release of gas from the motor vehicle 3 during the course of a charging process. A reason for this may for example be that a user of the motor vehicle 3 seeks to exchange the previously used gas for a different gas type in order to thereby for example increase the efficiency of the solid-gas battery 33 during operation and the possible range of the motor vehicle 3. For example, the charging device 1 includes a gas-receiving unit 13 which, during the course of the charging process, receives gas from the motor vehicle 3 by way of the supply connection 9, in order to store said gas for example in a gas tank. For example, an exchange of the gas for the solid-gas battery 33 is made possible in this way. It is thus possible, for example, for synthetic air which has previously been introduced into a tank and which is for example stored in a high-pressure tank 35 of the motor vehicle 3 to be exchanged for pure oxygen, which possibly permits greater efficiency, and thus a greater range of the motor vehicle 3, in relation to the synthetic air during operation of the solid-gas battery 33.

Furthermore, by way of the gas-receiving unit 13, it is also possible during the course of the charging process for the emitted gas, which as a result of the operation during the discharging of the solid-gas battery 33 was chemically bonded to the positive ions of the solid on the cathode, to be received and supplied again to the high-pressure tank 35 of the motor vehicle 3.

The charging with electrical current and gas for the solid-gas battery 33 may, during the course of the charging process, take place for example simultaneously or else temporally in succession. The at least one supply connection 9 is in this case designed correspondingly, and in this exemplary embodiment is realized as a type of combination connection. Alternatively, multiple supply connections 9 are formed, which realize the described functions.

The charging device 1 of the exemplary embodiment in FIG. 1 furthermore includes a compressor 11 and an air-conditioning system 21. Furthermore, the gas supply unit includes a gas treatment unit 15, by way of which gas can be treated, which gas is provided to the motor vehicle 3 for the solid-gas battery 33. The gas treatment unit 15 is, in the exemplary embodiment described here, coupled to the gas-receiving unit 13, to the gas reservoir 8, to the two gas tanks 17, to the connection 10 for ambient air, and to the compressor 11. In this way, it is for example possible for harmful constituents of the gas to be filtered out, regardless of where the gas supply unit 7 draws gas from for the charging process. By way of the gas treatment unit 15, the gas is consequently purified and/or treated before being supplied, during the course of the charging process, to the motor vehicle 3 for the solid-gas battery 33. In the case of, for example, pure oxygen being drawn from the gas reservoir 8 or from a gas tank 17 for the charging process, treatment of the gas is not imperatively necessary, and said gas can be supplied to the motor vehicle 3 for the solid-gas battery 33 without passing through the gas treatment unit 15. This is illustrated for example by way of pipelines of the pipeline system which run around the gas treatment unit 15.

For example, the gas can, by way of the gas treatment unit 15, be substantially purified for removal of water and carbon dioxides, which adversely influence the operation of the solid-gas battery 33 even in the range from for example 100 to 400 ppm, and which can permanently damage the solid-gas battery 33. Other contaminants, such as for example particles and hydrocarbons, may also be separated out in this way, such that the treated gas is subsequently supplied to the motor vehicle 3 or is stored for example for a later charging process. By way of the connection 10 for ambient air, it is possible in this way for gas to be drawn from the ambient air and for said gas to be treated as described. During the further process, it is then for example possible, during the course of the charging process, for the treated ambient air to be supplied, having been compressed by way of the compressor 11, to the motor vehicle 3 in order to thus, for example, provide the oxygen required for the operation of the solid-gas battery 33. Alternatively or in addition, it is also possible for the treated ambient air to be stored in a gas tank 17, for example for a later charging process.

The gas treatment unit 15 contributes to a longer service life of the solid-gas battery 33 of the motor vehicle 3 and will thereby most likely also delay a time for maintenance of the solid-gas battery 33 of the motor vehicle 3.

The gas for the solid-gas battery 33 may also be supplied to the motor vehicle 3 under pressure during the course of the charging process. In this case, the gas is compressed by way of the compressor 11 before passing to the high-pressure tank 35 of the motor vehicle 3. A possible pressure range assumed by the gas in compressed form in the high-pressure tank 35 is between 300 bar and 700 bar. Other pressure ranges are however likewise possible. By virtue of the fact that, during the course of the charging process, the gas is supplied in compressed form to the motor vehicle 3, it is possible to store a greater gas volume for example in the high-pressure tank 35 of the motor vehicle 3, which can have an advantageous effect on the power capacity of the solid-gas battery 33 and on the possible range of the motor vehicle 3.

The compressor 11 is, as a component of the gas supply unit 7, arranged externally with respect to the motor vehicle 3 and is integrated in the charging device 1. This permits charging with and storage of compressed gas for motor vehicles 3 which themselves do not have an on-board compressor 11. In this way, it is possible to realize motor vehicles 3 with solid-gas batteries 33 in which weight, volume and costs that would be involved in the case of a compressor 11 being installed in a motor vehicle 3 can be eliminated. The weight reduction of the motor vehicle 3 made possible by way of the described charging device has an advantageous effect on the energy density and power capacity of the solid-gas battery 33, and, by way of the associated volume reduction, permits an adaptation of other components of the motor vehicle 3, such as for example of the high-pressure tank 35. On this basis, said high-pressure tank can be made larger in terms of its dimensions than would be possible in the case of a motor vehicle 3 with compressor 11. Consequently, the arrangement of the compressor 11 in the charging device and externally with respect to the motor vehicle 3 contributes to more efficient operation of the solid-gas battery 33.

Furthermore, the compressor 11 can also be made larger in terms of its construction than would be possible in the case of a mobile compressor. This can furthermore have an advantageous effect on the charging process of the motor vehicle 3, because, in the case of a functionally identical basic concept, small compressors generally exhibit lower efficiency than compressors of larger form. Consequently, in this way, faster charging with gas during the course of the charging process is possible.

By way of the air-conditioning system 21 of the charging device 1, it is possible for the gas to be temperature-controlled, for and/or during the charging process, to a temperature which permits for example fast and/or battery-preserving charging of the motor vehicle 3. For example, by way of the air-conditioning system 21, a certain temperature range of the gas provided by the gas supply unit 7 is maintained, which temperature range realizes optimum operation of the solid-gas battery 33 of the motor vehicle 3 within a short time. For example, it is also the case that one of the two gas tanks 17 is a cryogenic store which is cooled by way of the air-conditioning system 21 and which permits for example charging with liquid oxygen for the motor vehicle 3. In this exemplary embodiment, the air-conditioning system 21 includes the two gas tanks 17 and a part of the pipeline system. It is however alternatively or additionally possible to realize a situation in which the gas-receiving unit 13, the gas treatment unit 15 and other components of the charging device 1 are temperature-controlled and integrated into the area of influence of the air-conditioning system 21.

Furthermore, the exemplary embodiment of the charging device 1 in FIG. 1 has a communication interface 23, by way of which it is possible to communicate with the motor vehicle 3 and thus control the charging process of the motor vehicle 3. In this context, the motor vehicle 3 is for example equipped with a corresponding motor vehicle communication interface 39 which permits such communication. For example, in this way, a vehicle or battery management system of the motor vehicle 3 is controlled by the charging device 1, which vehicle or battery management system monitors inter alia the charging process. Here, the communication includes a transmission of various items of information, such as for example a status of the charging process, a system pressure, an oxygen content of the supplied gas, a fill level of the high-pressure tank, a pressure in the solid-gas battery, a gas temperature, or a battery temperature. The charging device 1 is furthermore designed to determine the items of information and measurement values required for the communication, and can for example monitor the charging process by way of various sensors. This is indicated in FIG. 1 by way of lines which lead away from the communication interface and which end at the electrical line of the energy supply unit 5 and in the pipeline to the supply connection 9. Measurement values and items of information can thus be received and transmitted, such that, for example, a control unit (not explicitly illustrated) of the charging device 1 can influence the charging process in targeted fashion.

Owing to the communication between the charging device 1 and the motor vehicle 3, an optimum and reliable charging process with electrical current and/or gas for the solid-gas battery 33 is consequently made possible.

The described charging device 1 may for example be realized similarly to known refueling stations for motor vehicles with internal combustion engines in the public infrastructure, though may also be implemented privately for non-commercial purposes. If the charging device 1 is for example implemented at a domestic address of a user, the charging device 1 may in this context also be referred to as a private charging station, and additionally also permits charging of solid-gas batteries which supply electrical energy to components which are arranged for example in a domestic residence of the user and which do not belong to the motor vehicle 3.

Figure 2:
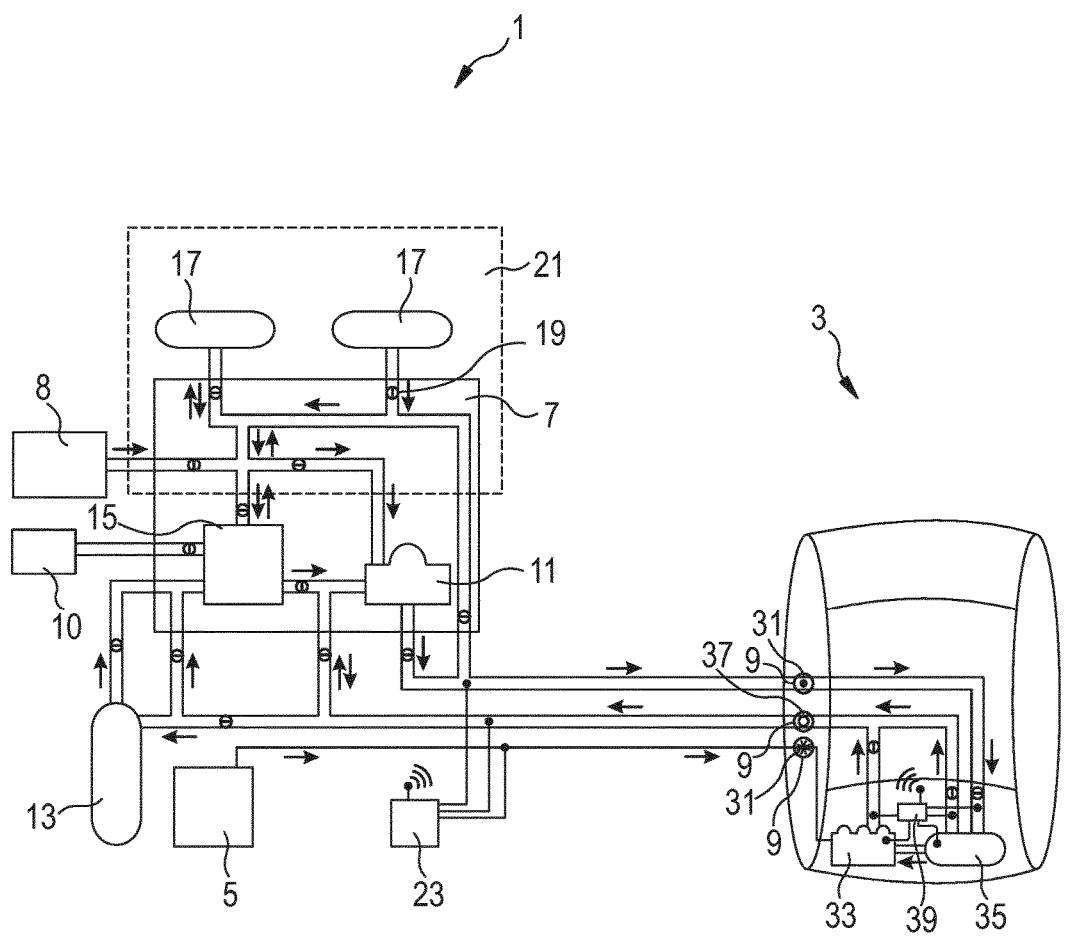
FIG. 2 is a schematic diagram of a system for charging a motor vehicle.

FIG. 2 illustrates a system for the charging of the motor vehicle 3, which includes an exemplary embodiment of the charging device 1 and the motor vehicle 3. The charging device 1 substantially corresponds, in terms of the embodiment, to the charging device 1 from FIG. 1, with the difference that, in FIG. 2, three supply connections 9 of the charging device 1 are illustrated, which, separately from one another, permit the charging with electrical current and/or gas and the receiving of gas from the motor vehicle 3 during the course of the charging process. The motor vehicle 3 correspondingly has three complementary connections which, during the course of the charging process, are coupled to the respective associated supply connection 9 of the charging device 1. Here, a first supply connection 9 of the charging device 1 for the charging with gas is coupled to a first charging connection 31, a second supply connection 9 for the charging with electrical current is coupled to a second charging connection 31, and a third supply connection 9 for receiving gas is coupled to the gas release connection 37 of the motor vehicle 3.

The first charging connection 31 is coupled to the high-pressure tank 35 of the motor vehicle 3 by way of a feed line, and allows gas which is provided, and supplied during the course of the charging process, by the charging device 1 to be received. The second charging connection 31 is coupled for example by way of a simple electrical line to the solid-gas battery 33, and supplies electrical current to the latter during the course of the charging process, which consequently leads to charging of the solid-gas battery 33. The gas release connection 37 is for example coupled to the high-pressure tank 35 and to the solid-gas battery 33 and thus makes it possible for a gas type previously introduced into the tank to be exchanged, and/or for the gas emitted during the charging process to be recirculated for example out of a housing of the solid-gas battery 33. Here, the gas is received for example by the gas-receiving unit 13 of the charging device 1, in the further process is purified by way of the gas treatment unit 15 for removal of harmful constituents, is subsequently compressed by way of the compressor 11, and is supplied under pressure to the motor vehicle 3 again. The treated gas is possibly also, before the compression, mixed with gas from one of the gas tanks 17, in order thereby for example to permit a maximum capacity of the high-pressure tank 35 and the greatest possible range of the motor vehicle 3.

The supply connections 9 are for example designed so as to have at least the common connector shapes in accordance with their function. They may however also be designed differently in terms of their embodiment such that, during the course of the charging process, it is at least the case that charging with electrical current and/or gas for the solid-gas battery 33 is possible at all times.

LIST OF REFERENCE DESIGNATIONS

1 Charging device
3 Motor vehicle
5 Energy supply unit
7 Gas supply unit
8 Gas reservoir
9 Supply connection
10 Connection to ambient air
11 Compressor
13 Gas-receiving unit
15 Gas treatment unit
17 Gas tank
19 Valve
21 Air-conditioning system
23 Communication interface
31 Charging connection
33 Solid-gas battery
35 High-pressure tank
37 Gas release connection
39 Motor vehicle communication interface The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A charging device for charging a motor vehicle, comprising:
    an energy supply unit which is arranged externally with respect to the motor vehicle and which is configured to provide electrical current for a solid-gas battery of the motor vehicle;
    a gas supply unit which is arranged externally with respect to the motor vehicle and which is configured to provide gas for the solid-gas battery of the motor vehicle; and
    at least one supply connection by way of which the energy supply unit is coupleable to the motor vehicle, during the course of a charging process, for supplying the electrical current for the solid-gas battery, and by way of which the gas supply unit is coupleable to the motor vehicle, during the course of the charging process, for supplying the gas for the solid-gas battery;
    wherein the at least one supply connection includes an insulated electrical line for supplying the electrical current and includes a gas line for supplying the gas and wherein the insulated electrical line is surrounded by the gas line.

2. The charging device according to claim 1, wherein
    the gas supply unit comprises a compressor which is configured to compress gas for the solid-gas battery and supply said gas to the motor vehicle, said gas being provided during the course of the charging process.

3. The charging device according to claim 1, further comprising:
    a gas-receiving unit which is arranged externally with respect to the motor vehicle and which is configured to receive gas from the motor vehicle during the course of the charging process.

4. The charging device according to claim 3, wherein
    the gas-receiving unit is coupled to the gas supply unit and is configured to at least partially supply to the gas supply unit the gas that is received from the motor vehicle during the course of the charging process.

5. The charging device according to claim 2, further comprising:
    a gas-receiving unit which is arranged externally with respect to the motor vehicle and which is configured to receive gas from the motor vehicle during the course of the charging process.

6. The charging device according to claim 1, wherein
    the gas supply unit comprises a gas treatment unit.

7. The charging device according to claim 1, further comprising:
    at least one gas tank which is arranged externally with respect to the motor vehicle and which is coupled to the gas supply unit.

8. The charging device according to claim 3, further comprising:
    at least one gas tank which is arranged externally with respect to the motor vehicle and which is coupled to the gas supply unit.

9. A charging device for charging a motor vehicle, comprising:
    an energy supply unit which is arranged externally with respect to the motor vehicle and which is configured to provide electrical current for a solid-gas battery of the motor vehicle;
    a gas supply unit which is arranged externally with respect to the motor vehicle and which is configured to provide gas for the solid-gas battery of the motor vehicle;
    at least one supply connection by way of which the energy supply unit is coupleable to the motor vehicle, during the course of a charging process, for supplying the electrical current for the solid-gas battery, and by way of which the gas supply unit is coupleable to the motor vehicle, during the course of the charging process, for supplying the gas for the solid-gas battery; and
    an air-conditioning system which is designed to cool or heat the gas for the solid-gas battery of the motor vehicle before and/or during the charging process.

10. A charging device for charging a motor vehicle, comprising:
    an energy supply unit which is arranged externally with respect to the motor vehicle and which is configured to provide electrical current for a solid-gas battery of the motor vehicle;
    a gas supply unit which is arranged externally with respect to the motor vehicle and which is configured to provide gas for the solid-gas battery of the motor vehicle;
    at least one supply connection by way of which the energy supply unit is coupleable to the motor vehicle, during the course of a charging process, for supplying the electrical current for the solid-gas battery, and by way of which the gas supply unit is coupleable to the motor vehicle, during the course of the charging process, for supplying the gas for the solid-gas battery;
    a gas-receiving unit which is arranged externally with respect to the motor vehicle and which is configured to receive gas from the motor vehicle during the course of the charging process;
    at least one gas tank which is arranged externally with respect to the motor vehicle and which is coupled to the gas supply unit; and
    an air-conditioning system which is designed to cool or heat the gas for the solid-gas battery of the motor vehicle before and/or during the charging process.

11. The charging device according to claim 1, further comprising:
    a communication interface which is configured to, during the course of the charging process, exchange signals for control of the charging process between the charging device and the motor vehicle.

12. The charging device according to claim 10, further comprising:
    a communication interface which is configured to, during the course of the charging process, exchange signals for control of the charging process between the charging device and the motor vehicle.

13. A system for charging a motor vehicle, comprising
    a charging device according to claim 1, and
    the motor vehicle, which has the solid-gas battery and at least one supply connection for the supply of the electrical current and/or the gas for the solid-gas battery during the course of the charging process by way of the charging device.

14. The charging device according to claim 1, wherein
    during the course of the charging process, gas is received from the motor vehicle via the gas line.

* * * * *